UNITED STATES PATENT OFFICE.

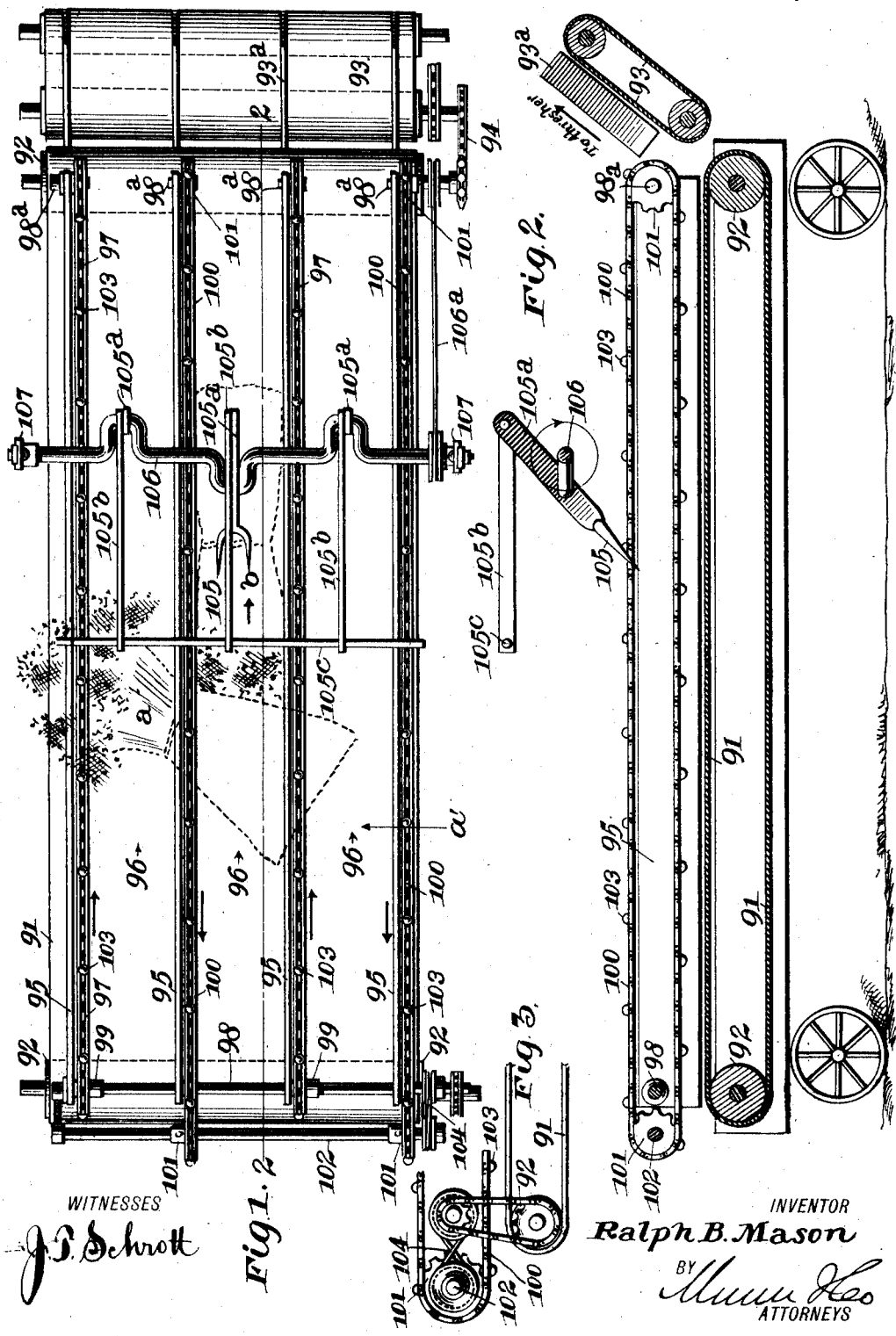

RALPH B. MASON, OF SOMERSET, PENNSYLVANIA.

SHEAF-DISTRIBUTER FOR THRESHERS.

1,341,238.　　　　　Specification of Letters Patent.　　Patented May 25, 1920.

Original application filed March 2, 1918, Serial No. 219,990. Divided and this application filed March 1, 1919. Serial No. 280,027.

*To all whom it may concern:*

Be it known that I, RALPH B. MASON, a citizen of the United States, and a resident of Somerset, in the county of Somerset and State of Pennsylvania, have invented certain new and useful Improvements in Sheaf-Distributers for Threshers, of which the following is a specification.

My invention relates to improvements in distributing devices, it being intended more particularly to be used in connection with a thresher, and it consists in the constructions, combinations and arrangements herein described and claimed.

An object of my invention is to provide a sheaf distributer for alining the sheaves and conveying them in an orderly manner to a thresher with which the distributer coöperates.

Other objects and advantages will appear in the following specification, reference being had to the accompanying drawing, in which—

Figure 1 is a plan view of the sheaf distributer,

Fig. 2 is a longitudinal section on the line 2—2 of Fig. 1, and

Fig. 3 is a detail view of the driving connections for the oppositely movable chain belts of the distributer.

This is a divisional application of a part of the subject matter disclosed in a co-pending application for a patent on agricultural implements, filed March 2, 1918, Serial Number 219,990.

It is intended more particularly in the present instance, that the sheaf distributer be used in connection with a thresher and to coöperate with the container of a sheaf loader, substantially in the manner shown in my co-pending application above referred to.

The sheaf distributer consists of a broad endless belt 91 moving over rollers 92 which are supported on a low truck of any suitable design as generally indicated in Fig. 2. The distributer includes the conveyer 93 which is inclined as in Fig. 2, and the conveyer 93 can be driven by any suitable means, as for instance through the medium of the chain 94 from an adjacent thresher with which the distributer coöperates.

The belt 91 is driven by a chain 94 from the lower shaft of the conveyer 93. Partitions 93$^a$ are fixedly supported over the conveyer 93 by any suitable means, and are intended to keep the sheaves in line in substantially the same manner as they are discharged from the distributer.

Boards 95 disposed longitudinally of the belt 91, provide a plurality of partitions defining a number of passages 96 into which the sheaves drop or are dropped, before being conveyed to the thresher. The partitions 95 are for the purpose of alining the sheaves so that they all may be fed to the thresher in a uniform position, the partitions 95 being arranged in substantial continuation of the partitions 93$^a$.

A chain belt 97 is mounted adjacent to the top edge of alternate partitions 95. A common shaft 98 is mounted at one extremity of the distributer, while stub shafts 98$^a$ are mounted at the other extremity of the distributer next to the conveyer 93. The various shafts carry sprockets 99 to which the chain belts 97 are applied as shown. Similarly disposed chain belts 100 are mounted adjacent to the top edges of the remaining partitions, and are applied to sprockets 101 on a shaft 102 at the front, and similar sprockets 101 on certain of the common subshafts 98$^a$ at the rear.

Buttons 103 are attached to the chain belts so that a better grip may be gotten on the sheaves when they fall upon the chain belts. The alternate chain belts travel in opposite directions. To accomplish this, the shaft 98 at the front is rotated in a clockwise direction, and the adjacent shaft 102 is rotated in a counter-clock-wise direction. A cross belt 104 causes these shafts to rotate thus. The shaft 98 is driven from the shaft of the adjacent roller 92 of the belt 91 as shown in Fig. 3.

Now having so much of the construction in mind, it may be readily understood that when a sheaf *a* is dropped upon the distributer crosswise of the chain belts as shown in Fig. 1, having entered, for example, from the side as indicated by the arrow *a'*, the buttons 103 on the oppositely moving chain belts 97 and 100, will grip the sheaf and rotate it until the sheaf falls into one of the passages 96 and assumes the position *b*.

The belt 91 will now convey the sheaf toward the elevator 93. The same thing happens to as many sheaves as may be discharged onto the distributer. In this connection it should be stated, that the sheaf loader formerly spoken of, is backed to the side of the distributer so as to more readily enable the discharge of the sheaves. The functions of the distributer are also more readily performed by backing the loader to the side as stated. The distributer is a little longer than the loader is wide, so as to give the sheaves space enough in which to properly line up.

There may be as many passages 96 as experience may dictate to be practicable. In Fig. 1, three are shown. The number of passages will probably be increased as the size of the container of the sheaf loader which coöperates with the distributer increases, and also as the capacity of the thresher increases.

A plurality of oscillating forks 105 which include the bars 105$^a$, are supported on oscillating rods 105$^b$ which are pivoted on a cross bar or common pivot 105$^c$. The forks 105 are moved back and forth by the cranks of a shaft 106. The shaft 106 is mounted in adjustable bearings 107, so that the shaft may be raised or lowered. The forks 105 move back and forth as explained above and their function is to throw back surplus numbers of sheaves in case the sheaves are forwarded too rapidly. The shaft 106 is rotated by a straight belt connection 106$^a$ driven from the shaft of the rear roller 92.

It will be gathered from Fig. 2, that the forks 105 move in elliptical paths, and that the location of operation of the forks can be transferred to any position above the belt 91 within the limits af adjustment of the bearings 107. The backward strokes of the forks sweep the surplus sheaves back. The return strokes of the forks are made along the upper paths of movement thereof and are thereby entirely free from the sheaves.

While the construction and arrangement of the various parts of the distributer are that of a generally preferred form, obviously modifications and changes may be made without departing from the spirit of the invention or the scope of the claims.

I claim:

1. A sheaf distributer, arranged to coöperate with a thresher and to be driven thereby when arranged in such coöperation, comprising a uni-directionally movable sheaf forwarding member, and alternately continuously oppositely movable means for receiving sheaves discharged on the distributer at random and alining them on said sheaf forwarding member.

2. A distributer, a uni-directionally and horizontally moving member including a belt forming the bottom for forwarding sheaves to a coöperating thresher; and means for receiving sheaves thrown at random on the distributer and alining them on said forwarding member, said means including alternately disposed members continuously moving oppositely and operating in a plane above said forwarding member.

3. A distributer, a uni-directionally and horizontally moving member including a belt forming the bottom for forwarding sheaves to a coöperating thresher; and means for receiving sheaves thrown at random on the distributer and alining them on said forwarding member, said means including alternately continuously oppositely moving members operating in a plane at right angles to said forwarding member.

4. A distributer, comprising a horizontally movable belt forming the bottom, a plurality of members operating in a plane above the belt, some moving with the belt and alternate ones moving oppositely to the belt, but all moving in the respective directions continuously, said members being arranged to receive sheaves discharged upon the distributer at random and to turn them into the same positions on the belt, and means affixed to said members for securing a better grip on the sheaves, including spaced buttons.

5. A distributer, comprising a horizontally moving belt forming the bottom, means providing a plurality of longitudinal passages, including a plurality of uniformly spaced partitions supported over the belt; and means mounted adjacent to the tops of said passage-forming partitions for receiving sheaves discharged upon the distributer at random and turn them into the same positions in the passages on the belt, said means including chain belts moving in alternately opposite directions and provided with grips for securing a firmer hold on the sheaves.

6. A distributer, comprising a horizontally movable belt forming the bottom, spaced partitions providing a plurality of longitudinal passages along the belt, chain belts mounted adjacent to the tops of the partitions and operating in a vertical plane, means for operating the chain belts in alternately opposite directions to each other, and sheaf-gripping means including buttons fixed on the chain belts.

7. A distributer, comprising a horizontally movable belt forming the bottom, partitions supported over the belt providing a plurality of sheaf passages longitudinally of the belt, a companion chain belt for each partition, means for operating the chain belts of each partition in alternately opposite directions with respect to each other to cause a sheaf thrown across said belts to be turned into position in the passage therebeneath, means including buttons on the chain belts for insuring a grip on the sheaf, and means operating over each passage to throw back surplus sheaves overcrowding said passages.

8. A distributer, comprising a horizontally movable belt forming the bottom, partitions supported over the belt providing a plurality of sheaf passages longitudinally of the belt, a companion chain belt for each partition, means for operating the chain belts of each partition in alternately opposite directions with respect to each other to cause a sheaf thrown across said belts to be turned into position in the passage therebeneath, means including buttons on the chain belts for insuring a grip on the sheaf, means operating over each passage to throw back surplus sheaves overcrowding said passages, said means including forks operating in circular paths; and means forming a part of the supports of said backward throwing means arranged to alter the zone of operation of said forks above said horizontally movable belt.

9. A distributer, comprising a movable belt forming the bottom, partitions arranged over the belt providing a plurality of longitudinal sheaf passages, stub shafts carried by all of the partitions at one end of the distributer, sprockets mounted on said stub shafts adjacent to each partition, a pair of oppositely revoluble shafts at the other end of the distributer, sprockets carried by both shafts and arranged alternately first on one then the other of the two shafts adjacent to said partitions, and a chain belt applied to each alining pair of sprockets longitudinally of the partitions, alternate ones of said chain belts thereby moving in opposite directions with respect to each other.

10. A distributer, comprising a horizontally movable belt forming the bottom, partitions arranged longitudinally of the belt to provide a plurality of passages, a chain belt operating at the top of each partition, means for moving the chain belts in opposite directions to each other, said chain belts having spaced buttons and being arranged to turn a sheave thrown crosswise thereon into alinement with an adjacent passage; a crank shaft disposed transversely above the chain belts, a plurality of forks operated in circular paths in the respective passages, rods supporting the tops of the forks and providing pivots, means for rotating the crank shaft from a moving part of the distributer, and means forming the bearing for the crank shaft and enabling the vertical adjustment thereof to change the zone of operation of said forks.

RALPH B. MASON.